United States Patent
Widener et al.

(10) Patent No.: US 10,738,712 B2
(45) Date of Patent: Aug. 11, 2020

(54) PNEUMATICALLY-ACTUATED BYPASS VALVE

(71) Applicant: General Electric Company, Schenectady, NY (US)

(72) Inventors: Stanley Kevin Widener, Greer, SC (US); Carlos Miguel Miranda, Greer, SC (US)

(73) Assignee: General Electric Company, Schenectady, NY (US)

( * ) Notice: Subject to any disclaimer, the term of this patent is extended or adjusted under 35 U.S.C. 154(b) by 310 days.

(21) Appl. No.: 15/417,579

(22) Filed: Jan. 27, 2017

(65) Prior Publication Data

US 2018/0216539 A1    Aug. 2, 2018

(51) Int. Cl.
| | |
|---|---|
| *F23R 3/26* | (2006.01) |
| *F02C 9/52* | (2006.01) |
| *F23R 3/06* | (2006.01) |
| *F01D 17/10* | (2006.01) |
| *F01D 9/02* | (2006.01) |
| *F16K 31/126* | (2006.01) |

(52) U.S. Cl.
CPC .............. *F02C 9/52* (2013.01); *F01D 9/023* (2013.01); *F01D 17/105* (2013.01); *F16K 31/1266* (2013.01); *F23R 3/06* (2013.01); *F23R 3/26* (2013.01); *F05D 2270/05* (2013.01); *F05D 2270/3061* (2013.01)

(58) Field of Classification Search
CPC .... F23R 3/04; F23R 3/26; F23R 3/002; F01D 9/023; F16K 7/16; F16K 7/17
USPC .................................................. 251/61, 61.2
See application file for complete search history.

(56) References Cited

U.S. PATENT DOCUMENTS

| | | | |
|---|---|---|---|
| 799,256 A | 9/1905 | Parker | |
| 2,659,198 A | 11/1953 | Cook | |
| 2,787,440 A | 4/1957 | Thompson, Jr. | |
| 2,880,579 A * | 4/1959 | Harshman | F02C 9/32 181/214 |
| 3,004,494 A | 10/1961 | Corbett | |
| 3,733,816 A | 5/1973 | Grennan et al. | |

(Continued)

FOREIGN PATENT DOCUMENTS

| | | |
|---|---|---|
| EP | 0391288 B1 | 5/1994 |
| EP | 1189805 A1 | 3/2002 |

(Continued)

OTHER PUBLICATIONS

U.S. Appl. No. 15/237,795, Office Action dated Nov. 26, 2018, 34 pages.

(Continued)

*Primary Examiner* — Craig Kim
*Assistant Examiner* — Alyson Joan Harrington
(74) *Attorney, Agent, or Firm* — Charlotte Wilson; Hoffman Warnick LLC

(57) ABSTRACT

A bypass valve for a combustor, including: a housing; an opening in the housing; a pneumatically actuated component within the housing; a passage coupling the opening in the housing and a duct of the combustor; a chamber formed by the housing and the pneumatically actuated component, the chamber containing a volume of air; and a control valve for controlling a pressure within the chamber to selectively displace the pneumatically actuated component to open and close the passage.

10 Claims, 4 Drawing Sheets

(56) References Cited

U.S. PATENT DOCUMENTS

| | | | |
|---|---|---|---|
| 3,851,998 A | 12/1974 | Downing | |
| 4,159,623 A | 7/1979 | McReynolds | |
| 4,255,927 A | 3/1981 | Johnson et al. | |
| 4,296,599 A | 10/1981 | Adamson | |
| 4,807,433 A | 2/1989 | Maclin et al. | |
| 5,022,817 A | 6/1991 | O'Halloran | |
| 5,051,065 A | 9/1991 | Hansen | |
| 5,235,812 A | 8/1993 | Klaass et al. | |
| 5,279,109 A | 1/1994 | Liu et al. | |
| 5,349,812 A | 9/1994 | Taniguchi et al. | |
| 5,548,951 A | 8/1996 | Mumford et al. | |
| 5,557,920 A | 9/1996 | Kain | |
| 5,575,616 A | 11/1996 | Hagle et al. | |
| 5,716,423 A | 2/1998 | Krul et al. | |
| 5,737,922 A | 4/1998 | Schoenman | |
| 5,820,589 A | 10/1998 | Torgerson et al. | |
| 5,906,238 A | 5/1999 | Carmody et al. | |
| 5,924,276 A | 7/1999 | Mowill | |
| 5,988,589 A | 11/1999 | Mowill | |
| 6,016,824 A | 1/2000 | Watanabe | |
| 6,021,979 A | 2/2000 | Bender et al. | |
| 6,022,197 A | 2/2000 | Cygnor et al. | |
| 6,050,079 A | 4/2000 | Durgin et al. | |
| 6,226,977 B1 | 5/2001 | Ichiryu et al. | |
| 6,237,323 B1 | 5/2001 | Ojiro et al. | |
| 6,250,066 B1 | 6/2001 | Lawrence et al. | |
| 6,327,845 B2 | 12/2001 | Ojiro et al. | |
| 6,390,733 B1 | 5/2002 | Burbage et al. | |
| 6,416,279 B1 | 7/2002 | Weigand et al. | |
| 6,449,956 B1 | 9/2002 | Kolman et al. | |
| 6,471,675 B1 | 10/2002 | Rogers | |
| 6,568,188 B2 | 5/2003 | Kolman et al. | |
| 6,589,205 B1 | 7/2003 | Meadows | |
| 6,595,098 B1 | 7/2003 | Wray | |
| 6,622,475 B2 | 9/2003 | Brault et al. | |
| 6,860,098 B2 | 3/2005 | Suenaga et al. | |
| 6,892,543 B2 | 5/2005 | Nakae | |
| 6,931,859 B2 | 8/2005 | Morgan et al. | |
| 6,979,315 B2 | 12/2005 | Rogers et al. | |
| 7,000,396 B1 | 2/2006 | Storey | |
| 7,200,986 B2 | 4/2007 | Sanders | |
| 7,299,618 B2 | 11/2007 | Terazaki et al. | |
| 7,340,880 B2 | 3/2008 | Magoshi et al. | |
| 7,445,424 B1 | 11/2008 | Ebert et al. | |
| 7,631,504 B2 * | 12/2009 | Belsom | F01D 9/023 60/39.23 |
| 7,698,894 B2 | 4/2010 | Wood et al. | |
| 7,744,060 B2 * | 6/2010 | Sneh | F16K 7/14 251/331 |
| 7,823,389 B2 | 11/2010 | Seitzer et al. | |
| 7,876,224 B2 | 1/2011 | Prokopuk | |
| 8,083,205 B2 | 12/2011 | Sneh | |
| 8,171,998 B1 | 5/2012 | Darnell et al. | |
| 8,267,863 B2 | 9/2012 | Najafi et al. | |
| 8,275,533 B2 | 9/2012 | Davis, Jr. et al. | |
| 8,281,601 B2 | 10/2012 | McMahan et al. | |
| 8,307,662 B2 | 11/2012 | Turco | |
| 8,322,346 B2 | 12/2012 | Najafi et al. | |
| 8,549,864 B2 | 10/2013 | Langdon, II et al. | |
| 8,596,035 B2 | 12/2013 | Mowill | |
| 8,684,660 B2 | 4/2014 | Miranda et al. | |
| 8,966,877 B2 | 3/2015 | McKinney | |
| 9,028,206 B2 | 5/2015 | Liotta et al. | |
| 9,052,115 B2 * | 6/2015 | Stoia | F23R 3/346 |
| 9,097,084 B2 | 8/2015 | McDougall et al. | |
| 9,243,802 B2 | 1/2016 | Hawie et al. | |
| 2002/0087120 A1 | 7/2002 | Rogers et al. | |
| 2002/0148216 A1 | 10/2002 | Brault et al. | |
| 2005/0159789 A1 | 7/2005 | Brockway et al. | |
| 2005/0187509 A1 | 8/2005 | Wolf | |
| 2006/0016195 A1 | 1/2006 | Dalla Betta et al. | |
| 2006/0042256 A1 | 3/2006 | Storey | |
| 2007/0074516 A1 | 4/2007 | Peck et al. | |
| 2007/0137213 A1 | 6/2007 | Rickert et al. | |
| 2007/0187634 A1 * | 8/2007 | Sneh | F16K 7/14 251/30.01 |
| 2007/0193274 A1 * | 8/2007 | Belsom | F01D 9/023 60/773 |
| 2007/0241931 A1 | 10/2007 | Compton et al. | |
| 2007/0266705 A1 | 11/2007 | Wood et al. | |
| 2008/0095652 A1 | 4/2008 | Jiang | |
| 2008/0112798 A1 | 5/2008 | Seitzer et al. | |
| 2008/0269573 A1 | 10/2008 | Najafi et al. | |
| 2009/0005656 A1 | 1/2009 | Najafi | |
| 2009/0148273 A1 | 6/2009 | Suciu et al. | |
| 2009/0243855 A1 | 10/2009 | Prokopuk | |
| 2010/0236249 A1 | 9/2010 | McMahan et al. | |
| 2011/0088405 A1 | 4/2011 | Turco | |
| 2011/0173984 A1 | 7/2011 | Valeev et al. | |
| 2011/0265486 A1 | 11/2011 | Plant | |
| 2012/0039702 A1 | 2/2012 | Sharp | |
| 2013/0000315 A1 | 1/2013 | Mowill | |
| 2013/0046152 A1 | 2/2013 | Najafi et al. | |
| 2013/0051976 A1 | 2/2013 | Kirtley | |
| 2013/0145741 A1 | 6/2013 | Hawie et al. | |
| 2013/0152582 A1 | 6/2013 | Anschel et al. | |
| 2013/0154741 A1 | 6/2013 | Lee et al. | |
| 2013/0164157 A1 | 6/2013 | Roberts et al. | |
| 2013/0283807 A1 * | 10/2013 | Stoia | F23R 3/346 60/772 |
| 2013/0330168 A1 | 12/2013 | Liotta et al. | |
| 2014/0102544 A1 | 4/2014 | Riley | |
| 2014/0127110 A1 | 5/2014 | Huckenbeck et al. | |
| 2014/0216051 A1 | 8/2014 | Johnson et al. | |
| 2014/0255145 A1 | 9/2014 | Miranda et al. | |
| 2015/0000939 A1 | 1/2015 | Willner | |
| 2015/0013345 A1 | 1/2015 | Porter et al. | |
| 2015/0377669 A1 | 12/2015 | DeSilva et al. | |
| 2017/0191372 A1 | 7/2017 | Tralshawala et al. | |

FOREIGN PATENT DOCUMENTS

| | | |
|---|---|---|
| EP | 1832751 A1 | 9/2007 |
| EP | 1770331 A3 | 9/2014 |
| GB | 2470253 A | 11/2010 |
| WO | 8602406 A1 | 4/1986 |
| WO | 9104395 A2 | 4/1991 |
| WO | 9727923 A1 | 8/1997 |
| WO | 2001002242 A1 | 1/2001 |
| WO | 20060660010 A1 | 6/2006 |
| WO | 2008127845 A1 | 10/2008 |
| WO | 2009006249 A1 | 1/2009 |
| WO | 2010072998 A1 | 7/2010 |
| WO | 2012030776 A2 | 3/2012 |
| WO | 2013001361 A2 | 1/2013 |
| WO | 2014099330 A1 | 6/2014 |
| WO | 2014178731 A2 | 11/2014 |
| WO | 2015176902 A1 | 11/2015 |

OTHER PUBLICATIONS

U.S. Appl. No. 14/983,774, Office Action dated Jul. 10, 2018, 46 pages.
U.S. Appl. No. 14/983,768, Notice of Allowance dated Sep. 24, 2018, 17 pages.
U.S. Appl. No. 14/983,779, Office Action dated Mar. 15, 2018, 34 pages.
Extended European Report and Opinion issued in connection with corresponding EP Application No. 16204159.4 dated Jul. 19, 2017.
U.S. Appl. No. 14/983,768, Office Action dated Apr. 4, 2018, 32 pages.
U.S. Appl. No. 15/237,795, Notice of Allowance dated Apr. 11, 2019, 12 pgs.
U.S. Appl. No. 15/417,601, Office Action dated Aug. 7, 2019, 25 pages.

* cited by examiner

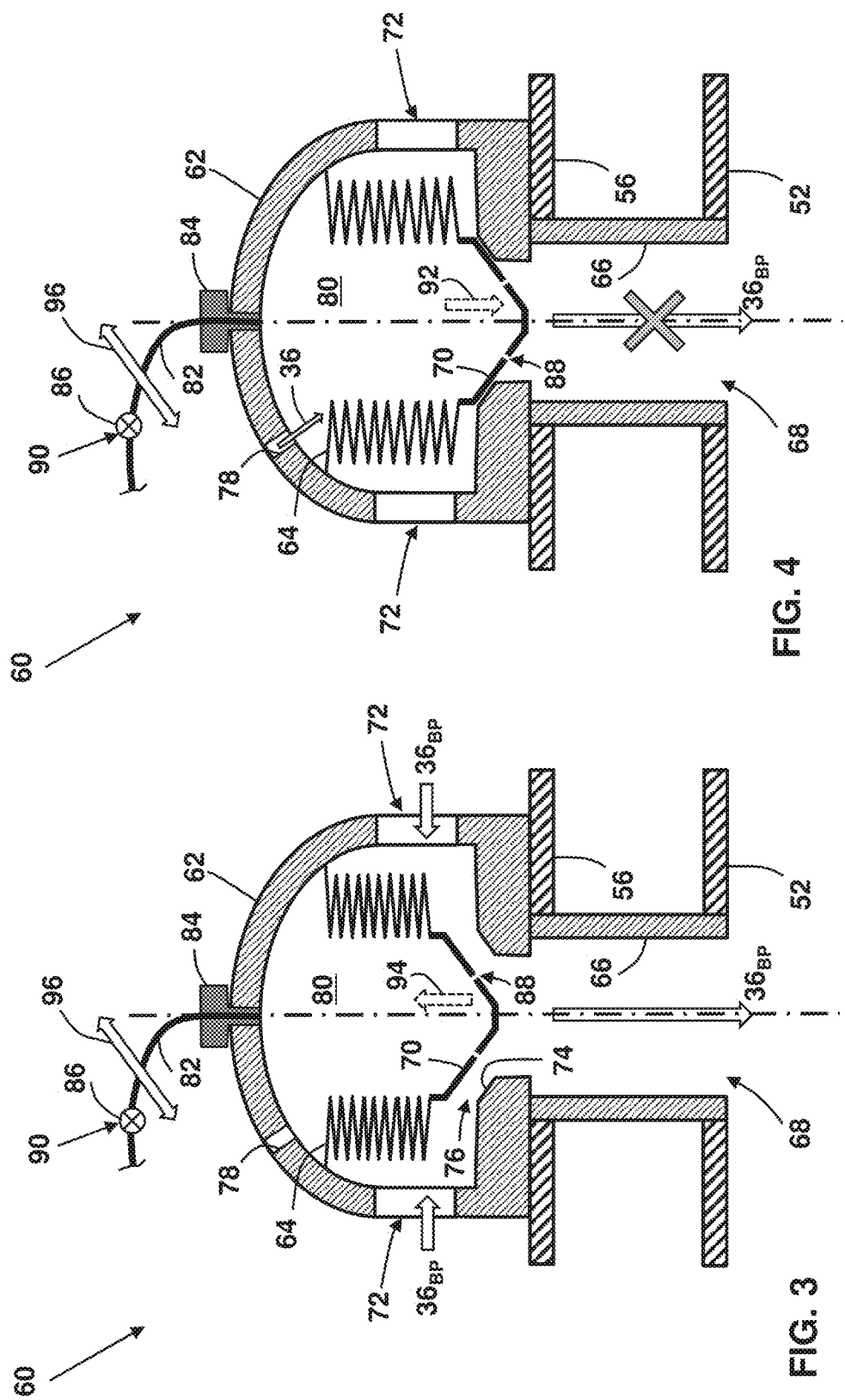

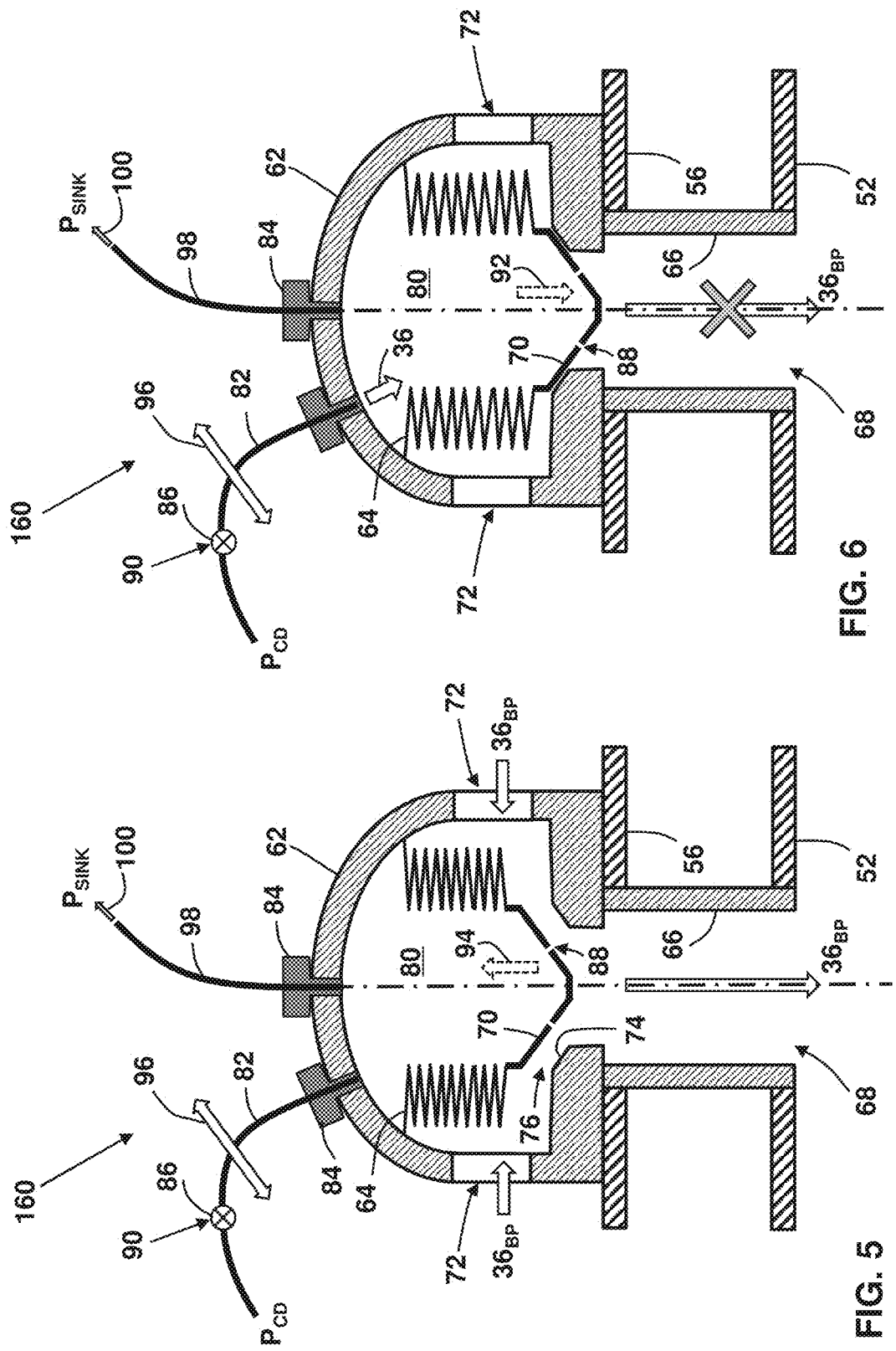

PNEUMATICALLY-ACTUATED BYPASS VALVE

BACKGROUND OF THE INVENTION

The disclosure relates generally to gas turbines, and more specifically, to a pneumatically-actuated bypass valve for selectively controlling bypass air flow in a combustor of a gas turbine.

Gas turbines typically include a compressor, a combustor section including one or more combustors, and at least one turbine section. Compressor discharge air is channeled into each combustor where fuel is injected via a plurality of fuel nozzles, mixed with air, and burned. The combustion gases are then channeled through a transition duct to the turbine section, which extracts energy from the combustion gases.

Gas turbine combustion systems typically operate over a wide range of flow, pressure, temperature, and fuel/air ratio operating conditions. Controlling combustor performance is required to achieve and maintain satisfactory overall gas turbine system operation and to maintain acceptable emissions levels (e.g., $NO_x$ and CO levels).

Extended turndown is highly desirable in today's power market where renewable energy sources are increasingly prevalent. These renewable energy sources are changing the operating profile for conventional power plants, driving more cyclic operation. With greater turndown, it is more economical to keep a gas turbine running at very low power during low periods of power demand, and available to add power to the grid as soon as the power output of renewable energy sources decreases (e.g., due to changes in input of wind or solar energy over the course of a day).

During load reductions, or "turndowns," it is important that combustion systems remain in emissions compliance. In order to maintain acceptable fuel-to-air ratios at the required turndown levels and to control the formation of $NO_x$ and CO, it is sometimes desirable to cause a portion of the compressor discharge air from the compressor section to bypass the reaction zone of the combustors. The bypass air is generally reintroduced into the duct of a combustor downstream of the reaction zone.

BRIEF DESCRIPTION OF THE INVENTION

A first aspect of the disclosure provides a bypass valve for a combustor, including: a housing; an opening in the housing; a pneumatically actuated component within the housing; a passage coupling the opening in the housing and a duct of the combustor; a chamber formed by the housing and the pneumatically actuated component, the chamber containing a volume of air; and a control valve for controlling a pressure within the chamber to selectively displace the pneumatically actuated component to open and close the passage.

A second aspect of the disclosure provides gas turbine system, comprising: a compressor component, a combustor component, and a turbine component, wherein the combustor component comprises: a housing; an opening in the housing; a pneumatically actuated component within the housing; a passage coupling the opening in the housing and a duct of the combustor; a chamber formed by the housing and the pneumatically actuated component, the chamber containing a volume of air; and a control valve for controlling a pressure within the chamber to selectively displace the pneumatically actuated component to open and close the passage.

A third aspect of the disclosure provides a bypass valve for a combustor, including: a housing; an opening in the housing; a pneumatically actuated component within the housing; a passage coupling the opening in the housing and a duct of the combustor; a chamber formed by the housing and the pneumatically actuated component, the chamber containing a volume of air; a control valve for controlling a pressure within the chamber to selectively displace the pneumatically actuated component to open and close the passage; a first conduit fluidly coupling the chamber and the control valve for selectively directing a first flow of air into the chamber; and a second conduit fluidly coupling the chamber and an exterior of the housing, a second flow of air continually passing from the chamber to the exterior of the housing.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure. In the drawings, like numerals refer to like elements.

FIG. 3 is a cross-sectional view of a pneumatically-actuated bypass valve in an open state according to embodiments.

FIG. 4 is a cross-sectional view of the pneumatically-actuated bypass valve of FIG. 3 in a closed state according to embodiments.

FIG. 5 is a cross-sectional view of a pneumatically-actuated bypass valve in an open state according to additional embodiments.

FIG. 6 is a cross-sectional view of the pneumatically-actuated bypass valve of FIG. 5 in a closed state according to additional embodiments.

It is noted that the drawings of the disclosure are not necessarily to scale. The drawings are intended to depict only typical aspects of the disclosure, and therefore should not be considered as limiting the scope of the disclosure.

DETAILED DESCRIPTION OF THE INVENTION

Figure 1:
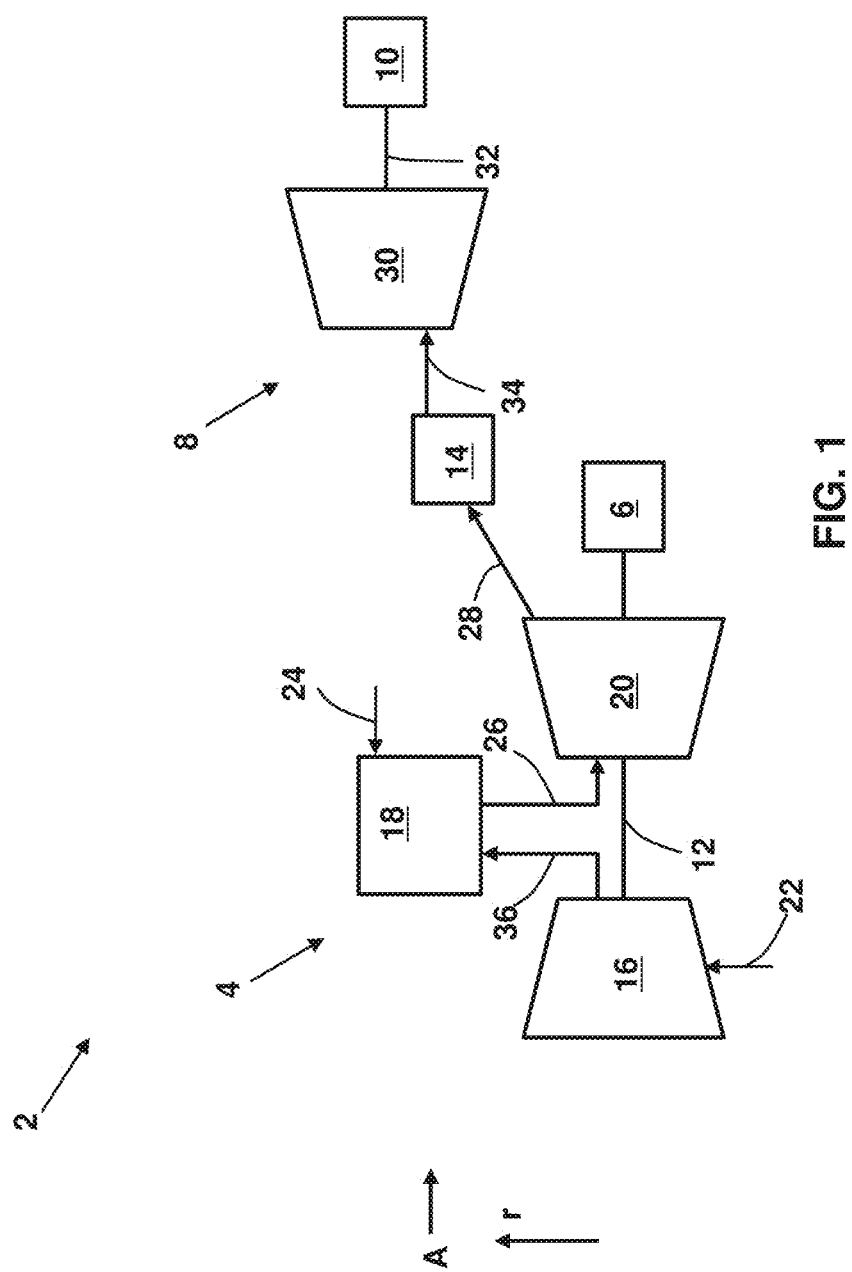
FIG. 1 is a schematic diagram of a combined cycle gas power generation system according to embodiments.

In the Figures, for example as shown in FIG. 1, the "A" axis represents an axial orientation. As used herein, the terms "axial" and/or "axially" refer to the relative position/direction of objects along axis A, which is substantially parallel with the axis of rotation of the turbomachine (in particular, the rotor section). As further used herein, the terms "radial" and/or "radially" refer to the relative position/direction of objects along an axis (r), which is substantially perpendicular with axis A and intersects axis A at only one location. In the description, a set of elements includes one or more elements.

Turning to FIG. 1, a schematic view of portions of an illustrative combined cycle power generating system 2 is shown. The combined cycle power generating system 2 includes a gas turbine system 4 operably connected to a generator 6, and a steam turbine system 8 operably coupled to another generator 10. The generator 6 and the gas turbine system 4 may be mechanically coupled by a shaft 12. Also shown in FIG. 1, a heat exchanger 14 is operably connected to the gas turbine system 4 and the steam turbine system 8. The heat exchanger 14 may be fluidly connected to both the gas turbine system 4 and the steam turbine system 8 via conventional conduits (numbering omitted).

The gas turbine system 4 includes a compressor system 16 and a combustor system 18. The gas turbine system 4 also includes a turbine section 20 coupled to the shaft 12. In operation, air 22 enters an inlet of the compressor system 16 and is compressed. Compressor discharge air 36 is provided to the combustor system 18 where a supply of fuel 24 is burned to provide high energy combustion gases 26, which drive the turbine section 20. Typically, the combustor system 18 includes a plurality of fuel nozzles for injecting fuel into a combustion area of the combustor section 18. In the turbine section 20, the energy of the combustion gases 26 is converted into work, some of which is used to drive the compressor system 16 through the rotating shaft 12, with the remainder available for useful work to drive a load such as the generator 6 via the shaft 12 for producing electricity.

FIG. 1 also represents the combined cycle in which the energy in the exhaust gases 28 exiting the turbine section 20 are converted into additional useful work. The exhaust gases 28 enter the heat exchanger 14 in which water is converted to steam 34. The steam turbine system 8 may include one or more steam turbines 30 (only one is shown), e.g., a high pressure (HP) turbine, an intermediate pressure (IP) turbine, and a low pressure (LP) turbine, each of which are coupled to a shaft 32. The steam turbine 30 includes a plurality of rotating blades (not shown) mechanically coupled to the shaft 32. In operation, steam 34 from the heat exchanger 14 enters an inlet of the steam turbine 30 and is channeled to impart a force on the blades of the steam turbine 30 causing the shaft 32 to rotate. The rotating shaft 32 may be coupled to the generator 10 to produce additional electric power.

Figure 2:
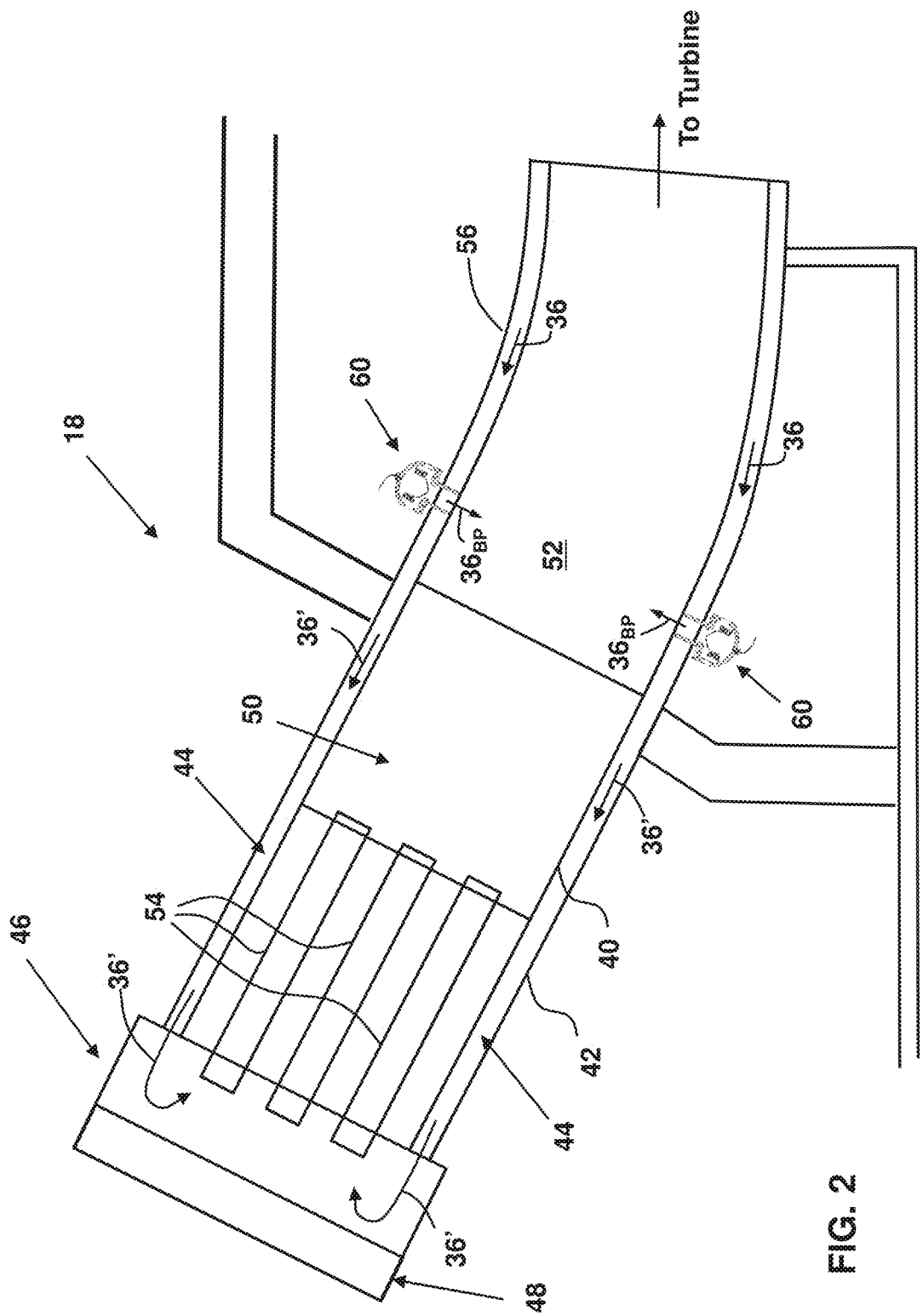
FIG. 2 is a cross-sectional illustration of a combustor section of a gas turbine system including a set of pneumatically-actuated bypass valves according to embodiments.

FIG. 2 depicts a simplified cross-sectional illustration of a combustor section 18 (hereafter "combustor 18") of a gas turbine system 4 according to embodiments.

The combustor 18 of the gas turbine system 4 includes a combustor chamber 40 enclosed within a compressor discharge casing 42. Generally described, the volume 44 located between the combustor chamber 40 and the compressor discharge casing 42 receives a flow of compressed air (compressor discharge air 36) provided by the compressor section 16. At least a portion 36' of the compressor discharge air 36 passes through the volume 44 toward a head end 46 of the combustor 18, which is closed by an end cover assembly 48.

The combustor chamber 40 further includes a reaction zone 50 in which a mixture of fuel and air is ignited and burned to form a flow of hot gases (e.g., combustion gases 26, FIG. 1). A duct 52 at the aft end of the combustor chamber 40 directs the flow of hot gases from the reaction zone 50 to the turbine section 20 where the hot gas may be used, for example, to drive a rotor shaft (e.g., shaft 12, FIG. 1) to produce power. A flow sleeve 56 surrounds the duct 52 and serves to direct compressor discharge air 36 toward the head end 46 through the volume 44. The end cover assembly 48 may include various supply passages, manifolds, and associated valving (not shown in FIG. 2) for supplying fuel to a plurality of fuel nozzles 54, which are configured to inject fuel and/or premixed air/fuel into the reaction zone 50 for combustion. Other fluids (e.g., air, water, oil, and/or the like) may also be supplied to the fuel nozzles 54 and/or other components of the combustion section 10 through the end cover assembly 48.

In order to maintain acceptable fuel-to-air ratios during turndown or low power operation, and to control the formation of $NO_x$ and CO, a portion (e.g., bypass air $36_{BP}$) of the compressor discharge air 36 may be extracted and reintroduced into a duct downstream of the reaction zone 50. The duct 52 may include the transition duct of the combustor 18, or any passage of the combustor 18 that is configured to receive a supply of bypass air $36_{BP}$. At least a portion of the remaining compressor discharge air 36' is directed to the head end 46 of the combustor 18 for use in combustion in the combustor 18.

According to the present disclosure, at least one pneumatically-actuated bypass valve 60 is provided for selectively controlling the flow of bypass air $36_{BP}$ into the duct 52 downstream of the reaction zone 50 of the combustor 18 of the gas turbine system 4. A pair of bypass valves 60 are provided in the example depicted in FIG. 2, although any suitable number of bypass valves 60 may be used. As shown, each bypass valve 60 is configured to selectively extract bypass air $36_{BP}$ from the compressor discharge air 36 and to direct the bypass air $36_{BP}$ into the transaction duct 52 of the combustor 18.

As shown in FIGS. 3 and 4, the bypass valve 60 includes a housing 62 containing a pneumatically actuated element which, according to embodiments, may include a flexible bellows 64. In embodiments, the bellows 64 extends circumferentially about an interior of the housing 62. The bellows 64 may be formed of metal or other material suitable for providing the functionality described herein.

A tube 66, which extends through a hole 68 in the flow sleeve 56 and the duct 52 of the combustor 18 downstream of the reaction zone 50, fluidly couples the housing 62 of the bypass valve 60 to the interior of the duct 52. The hole 68 may be drilled or formed in any suitable manner through the flow sleeve 56 and the duct 52. The housing 62 and tube 66 of the bypass valve 60 may be formed as a single unit or may be secured together using any suitable technique (e.g., welding, threads, etc.). The bypass valve 60 may be welded in position on the combustor 18 (e.g., to the duct 52) or secured to the combustor 18 in any other suitable manner.

A sealing element 70 is attached to a first end of the bellows 64. A second end of the bellows 64 is secured to the housing 62 of the bypass valve 60. A set of openings 72 are provided in the housing 62 of the bypass valve 60. When the bellows 64 is contracted as depicted in FIG. 3, the sealing element 70 does not contact a corresponding valve seat 74, forming a passage 76 therebetween. In this open state configuration, a supply of bypass air $36_{BP}$ may flow through the set of openings 72, passage 76, and tube 66, into the duct 52.

When the bellows 64 is expanded as depicted in FIG. 4, the sealing element 70 contacts the corresponding valve seat 74, closing the passage 76. In this closed state configuration, the supply of bypass air $36_{BP}$ can no longer flow through the set of openings 72 into the duct 52.

According to embodiments, the pressure outside of the housing 62 of the bypass valve 60 may be maintained at the pressure ($P_{CD}$) of the compressor discharge air 36. At least one channel 78 is provided through the housing 62 of the bypass valve 60 to allow a small amount of compressor discharge air 36 to enter the housing 62. Under certain operational conditions, the compressor discharge air 36 entering the housing 62 through the channel 78 pressurizes a bellows chamber 80 in the bypass valve 60, which is formed by the housing 62, bellows 64, and the sealing element 70, to approximately $P_{CD}$.

A conduit 82 is attached by a fitting 84 to the housing 62 of the bypass valve 60. A control valve 86 regulates the flow of air through the conduit 82 to selectively allow air to escape from the bellows chamber 80. According to embodiments, the control valve 86 may be actively controlled (e.g., electrically, pneumatically, hydraulically, etc.). In other embodiments, the control valve 86 may be passively controlled (e.g., in response to temperature and/or pressure). The conduit 82 discharges air from the bellows chamber 80 in the housing 62 of the bypass valve 60 to a location at a lower pressure $P_{SINK}$ (e.g., duct 52 at $P_{CC}$ (combustion chamber pressure), ambient ($P_{AMB}$), etc.). According to embodiments, the control valve 86 may be located outside of the compressor discharge casing 42.

A set of purge holes 88 may be formed through the sealing element 70. The purge holes 88 are configured to bleed a small amount of air into/out of the bellows chamber 80. For example, when the control valve 86 is open, a small amount of air may enter the bellows chamber 80 from the passage 76 to aid in pressurization. When the control valve 86 is closed and bellows chamber 80 is fully pressurized, a small amount of air may continually escape from the bellows chamber 80 via the purge holes 88 (e.g., to cool the housing 62 and/or other components of the bypass valve 60).

The operation of the bypass valve 60 will now be described with reference to FIGS. 2, 3, and 4, starting from an initial state as in FIG. 3, with the control valve 86 open and the bypass valve 60 also open.

When operating conditions of the combustor 18 are such that bypass air $36_{BP}$ is not required (e.g., during higher load operation (e.g., >50% load (±10% load), startup, shutdown, etc.), a control signal 90 is sent to the control valve 86 instructing the control valve 86 to close. The control signal 90 may be generated, for example, by a control system (not shown) of the combustor 18 or gas turbine system 4, or in any other suitable manner. With the control valve 86 in a closed state, air is not allowed to exit the bellows chamber 80 of the bypass valve 60 via the conduit 82. Compressor discharge air 36, however, flows into the bellows chamber 80 through the channel 78 (FIG. 4) since the pressure $P_{BC}$ within the bellows chamber 80 is lower than the pressure $P_{CD}$ of the compressor discharge air 36. Additionally, a small amount of air may flow into the bellows chamber 80 through the purge holes 88 (e.g., when the pressure $P_{BC}$ within the bellows chamber 80 is less than the pressure in the passage 76).

As the compressor discharge air 36 flows into the bellows chamber 80, the pressure $P_{BC}$ within the bellows chamber 80 increases towards $P_{CD}$, causing the bellows 64 to expand. The expansion of the bellows 64 displaces the sealing element 70 toward the valve seat 74 as indicated by arrow 92 in FIG. 4. As the passage 76 between the sealing element 70 and the valve seat 74 narrows due to the expansion of the bellows 64, the flow of bypass air $36_{PB}$ through the passage 76 decreases. The flow of bypass air $36_{PB}$ through the passage 76 terminates when the sealing element 70 contacts the valve seat 74. In this state, no bypass air $36_{PB}$ flows into the duct 52 through the bypass valve 60. In summary: control valve 86 closed ➔ $P_{BC}$ approaches $P_{CD}$ ➔ bellows 64 expands ➔ bypass valve 60 closes.

When bypass air $36_{BP}$ is required in the combustor 18 (e.g., during turndown, low power operation, etc.), a control signal 90 is sent to the control valve 86 instructing the control valve 86 to open. With the control valve 86 in an open state, air can exit the bellows chamber 80 of the bypass valve 60 via the conduit 82. Additionally, a small amount of air may flow out of the bellows chamber 80 into the duct 52 through the purge holes 88 (e.g., when the pressure $P_{BC}$ within the bellows chamber 80 is greater than the pressure $P_{CC}$ in the duct 52).

As air 36 flows out of the bellows chamber 80, the pressure $P_{BC}$ within the bellows chamber 80 decreases, causing the bellows 64 to contract. The contraction of the bellows 64 displaces the sealing element 70 away from the valve seat 74 as indicated by arrow 94 in FIG. 3. As the passage 76 between the sealing element 70 and the valve seat 74 widens due to the contraction of the bellows 64, the flow of bypass air $36_{BP}$ through the passage 76 and into the duct 52 (see, e.g., FIG. 3) increases. The flow of bypass air $36_{BP}$ reaches its maximum value when the bellows 64 is fully contracted. In summary: control valve 86 open ➔ $P_{BC}$ drops ➔ bellows 64 contracts ➔ bypass valve 60 opens.

When a plurality of bypass valves 60 are used with the combustor 18, one or more manifolds 96 may be used to synchronize the operation of the plurality of bypass valves 60. A control valve 86 may be used to control and synchronize the operation of the plurality of bypass valves 60 connected to a given manifold 96.

The bypass valve 60 is pneumatically actuated and includes no components that slide against each other. There are no sliding interfaces in the bypass valve 60, so component wear in the hot environment of the combustor 18 is limited providing higher durability. The bypass valve 60 is insensitive to dynamic pressures from combustion (e.g., $P_{CC}$). The opening/closing process may be completed in a relatively short time (e.g., 2-5 seconds from fully closed to 90% open). Use of a set of bypass valves 60 allows a large variable flow area to be actuated within the combustor 18, where a bypass path can be opened or closed as needed in response to changing gas turbine conditions. The bypass valve 60 can be retrofitted to existing combustion systems, so it can be sold as an upgrade package.

Another embodiment of a pneumatically-actuated bypass valve 160 for selectively controlling the flow of bypass air $36_{BP}$ into the duct 52 of the combustor 18 of the gas turbine system 4 is depicted in FIGS. 5 and 6. FIG. 5 is a cross-sectional view of the bypass valve 160 in an open state, while FIG. 6 is a cross-sectional view of the bypass valve 160 of FIG. 5 in a closed state.

In the bypass valve 160, the control valve 86 has the opposite action relative to opening and closing the bypass valve 160 when compared to the bypass valve 60. Instead of controlling air flow leaving the bellows chamber 80, the control valve 86 controls the flow of compressor discharge air 36 at a pressure $P_{CD}$ entering the bellows chamber 80. As described above, the control valve 86 may be actively controlled (e.g., electrically, pneumatically, hydraulically, etc.), or may be passively controlled (e.g., in response to temperature and/or pressure). For example, the control valve 86 can be supported by a passive, thermally-actuated valve that opens as temperature increases (e.g., high load conditions).

The operation of the bypass valve 160 will now be described with reference to FIGS. 2, 5, and 6.

When operating conditions of the combustor 18 are such that bypass air $36_{BP}$ is not required, a control signal 90 is sent to the control valve 86 instructing the control valve 86 to open. With the control valve 86 in an open state, compressor discharge air 36 is allowed to flow into the bellows chamber 80 through the conduit 82 (FIG. 6). As the compressor discharge air 36 flows into the bellows chamber 80, the pressure $P_{BC}$ within the bellows chamber 80 increases towards $P_{CD}$, causing the bellows 64 to expand. The expansion of the bellows 64 displaces the sealing element 70 toward the valve seat 74 as indicated by arrow 92 in FIG. 6. As the passage 76 between the sealing element 70 and the valve seat 74 narrows due to the expansion of the bellows 64, the flow of bypass air $36_{PB}$ through the passage 76 decreases. The flow of bypass air $36_{PB}$ through the passage 76 terminates when the sealing element 70 contacts the valve seat 74. In this state, no bypass air $36_{PB}$ flows into the duct 52 through the bypass valve 160. In summary: control valve 86 open → $P_{BC}$ approaches $P_{CD}$ → bellows 64 expands → bypass valve 160 closes.

In the bypass valve 160, an additional conduit 98 is attached by a fitting 84 to the housing 62. The conduit 98 is configured to continually discharge a flow of air 100 from the bellows chamber 80 to a location at a lower pressure $P_{SINK}$ (e.g., duct 52 at $P_{CC}$ (combustion chamber pressure), ambient ($P_{AMB}$), etc.). When the control valve 86 is open, the flow of compressor discharge air 36 into the bellows chamber 80 is greater than the flow of air 100 passing out of the bellows chamber 80 to $P_{SINK}$, resulting in an expansion of the bellows chamber 80.

When bypass air $36_{BP}$ is required in the combustor 18 (e.g., during turndown, low power operation, etc.), a control signal 90 is sent to the control valve 86 instructing the control valve 86 to close. With the control valve 86 in a closed state (FIG. 5), compressor discharge air 36 can no longer flow into the bellows chamber 80 via the conduit 82. Air 100, however, flows out of the bellows chamber 80 through conduit 98 to $P_{SINK}$. This causes the pressure $P_{BC}$ within the bellows chamber 80 to decrease, resulting in a contraction of the bellows 64. The contraction of the bellows 64 displaces the sealing element 70 away from the valve seat 74 as indicated by arrow 94 in FIG. 5. As the passage 76 between the sealing element 70 and the valve seat 74 widens due to the contraction of the bellows 64, the flow of bypass air $36_{BP}$ through the passage 76 and into the duct 52 increases. The flow of bypass air $36_{BP}$ reaches its maximum value when the bellows 64 is fully contracted. In summary: control valve 86 closed → $P_{BC}$ drops → bellows 64 contracts → bypass valve 160 opens.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bypass valve system for a combustor, comprising:
   a housing positioned on a flow sleeve of the combustor, wherein the housing is entirely external to the flow sleeve;
   an opening through a sidewall of the housing, wherein the opening is fluidly coupled to a supply of compressor discharge air;
   a pneumatically actuated component extending circumferentially within the housing, wherein a first end of the pneumatically actuated component is attached to an inner surface of the housing and a second end of the pneumatically actuated component is attached to a sealing element;
   a passage, extending from a base of the housing, through the flow sleeve, and to a duct of the combustor, the passage fluidly coupling the opening in the housing and the duct of the combustor;
   a chamber formed by the housing, the pneumatically actuated component, and the sealing element, the chamber containing a volume of air;
   a channel, extending through the housing to the chamber and fluidly coupling the supply of compressor discharge air and the chamber, for pressurizing the air in the chamber;
   and a control valve for controlling the pressure within the chamber to selectively displace the sealing element of the pneumatically actuated component against a valve seat in the housing to open and close the passage to selectively direct at least a portion of the supply of compressor discharge air through the opening in the housing, into the passage, and into the duct of the combustor.

2. The bypass valve system according to claim 1, wherein, when the passage is open, the portion of the supply of compressor discharge air flows through the opening and the passage into the duct, and wherein, when the passage is closed, the portion of the supply of compressor discharge air is prevented from flowing through the opening and the passage, into the duct.

3. The bypass valve system according to claim 1, wherein the pneumatically actuated component includes a bellows.

4. The bypass valve system according to claim 3, wherein the sealing element engages the valve seat in the housing when the bellows is in an expanded state, and wherein the sealing element is disengaged from the valve seat when the bellows is in a contracted state.

5. The bypass valve system according to claim 4, further comprising:
a conduit fluidly coupling the chamber and the control valve.

6. The bypass valve system according to claim 5, wherein the bellows is configured to expand when:
the control valve is closed, preventing air from the chamber from escaping from the chamber through the conduit; and
a pressure of the compressor discharge air outside of the housing is greater than the pressure of the air contained in the chamber.

7. The bypass valve system according to claim 3, wherein the sealing element includes at least one purge hole for bleeding air into or out of the bellows.

8. The bypass valve system according to claim 1, wherein the combustor forms a portion of a gas turbine system.

9. A gas turbine system, comprising: a compressor component, a combustor component, and a turbine component; and
a bypass valve system for the combustor component, comprising:
a housing positioned on a flow sleeve of the combustor component, wherein the housing is entirely external to the flow sleeve;
an opening through a sidewall of the housing, wherein the opening is fluidly coupled to a supply of compressor discharge air;
a pneumatically actuated component extending circumferentially within the housing, wherein a first end of the pneumatically actuated component is attached to an inner surface of the housing and a second end of the pneumatically actuated component is attached to a sealing element;
a passage, extending from a base of the housing, through the flow sleeve, and to a duct of the combustor component, the passage fluidly coupling the opening in the housing and the duct of the combustor component;
a chamber formed by the housing, the pneumatically actuated component, and the sealing element, the chamber containing a volume of air;
a channel, extending through the housing to the chamber and fluidly coupling the supply of compressor discharge air and the chamber, for pressurizing the air in the chamber;
and a control valve for controlling the pressure within the chamber to selectively displace the sealing element of the pneumatically actuated component against a valve seat in the housing to open and close the passage to selectively direct at least a portion of the supply of compressor discharge air through the opening in the housing, into the passage, and into the duct of the combustor component.

10. The gas turbine system according to claim 9, wherein the pneumatically actuated component includes:
a bellows,
wherein the sealing element engages the valve seat in the housing when the bellows is in an expanded state, and wherein the sealing element is disengaged from the valve seat when the bellows is in a contracted state.

* * * * *